(12) United States Patent
Habermalz

(10) Patent No.: US 11,120,649 B2
(45) Date of Patent: Sep. 14, 2021

(54) METHOD FOR DISPLAYING THE ARRANGEMENT OF COMPONENTS IN A VEHICLE

(71) Applicant: VOLKSWAGEN AKTIENGESELLSCHAFT, Wolfsburg (DE)

(72) Inventor: Ulf Habermalz, Calberlah (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/904,771

(22) Filed: Jun. 18, 2020

(65) Prior Publication Data

US 2020/0402329 A1    Dec. 24, 2020

(30) Foreign Application Priority Data

Jun. 19, 2019 (DE) .................. 10 2019 208 932.1

(51) Int. Cl.
*G07C 5/08* (2006.01)
*H04W 4/48* (2018.01)

(52) U.S. Cl.
CPC ............ *G07C 5/0816* (2013.01); *H04W 4/48* (2018.02)

(58) Field of Classification Search
CPC ..... G07C 5/0816; H04W 4/48; B60R 16/037; B60R 21/01556; B60R 22/105; B60R 2022/4816; B60R 2022/4866; B60N 2/005; B60N 2/2806
See application file for complete search history.

(56) References Cited

U.S. PATENT DOCUMENTS

| | | | |
|---|---|---|---|
| 6,116,638 A | 9/2000 | Hosoda | |
| 6,561,543 B1* | 5/2003 | Hamada | B60N 2/002 280/734 |
| 9,994,150 B2 | 6/2018 | Appukutty et al. | |
| 10,328,841 B2 | 6/2019 | Bika et al. | |
| 2005/0189805 A1* | 9/2005 | Burley | B60N 2/002 297/250.1 |
| 2013/0088058 A1* | 4/2013 | Szakelyhidi | B60N 2/2842 297/256.16 |

FOREIGN PATENT DOCUMENTS

| | | |
|---|---|---|
| DE | 19803682 A1 | 8/1998 |
| DE | 102016113981 A1 | 2/2017 |
| DE | 102016121148 A1 | 5/2017 |
| WO | 2013055810 A1 | 4/2013 |

* cited by examiner

*Primary Examiner* — Hongmin Fan
(74) *Attorney, Agent, or Firm* — Barnes & Thornburg LLP

(57) ABSTRACT

A method for displaying the arrangement of components in a transportation vehicle in which the arrangement of the components increases the usage safety when the components are fixedly lockable at one or more fastening points in the transportation vehicle and have at least two different setting positions.

10 Claims, 1 Drawing Sheet

METHOD FOR DISPLAYING THE ARRANGEMENT OF COMPONENTS IN A VEHICLE

PRIORITY CLAIM

This patent application claims priority to German Patent Application No. 10 2019 208 932.1, filed 19 Jun. 2019, the disclosure of which is incorporated herein by reference in its entirety.

SUMMARY

Illustrative embodiments relate to a method for displaying the arrangement of components in a transportation vehicle. Furthermore, the illustrative embodiments relate to a transportation vehicle in which a disclosed method for displaying the arrangement of components is used.

BRIEF DESCRIPTION OF THE DRAWINGS

The disclosed embodiments are explained hereafter with reference to the associated drawings. In the figures.

DETAILED DESCRIPTION

Figure 1:
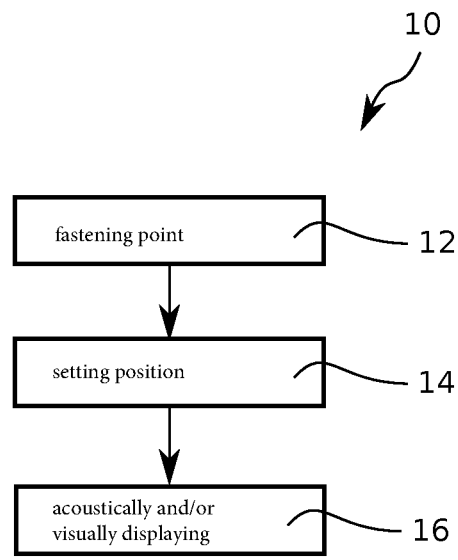
FIG. 1 shows a schematic illustration of an exemplary method for displaying the arrangement of components in a transportation vehicle.

Current transportation vehicles already have a variety of assistance systems, which assist the driver in a computer-based manner in a variety of driving situations. Such assistance systems can access sensors for recording a variety of measurement data, which far exceed the sensory capabilities of humans. Moreover, the speed of these assistance systems significantly exceeds the human reaction time. Known driver assistance systems are, for example, lane keeping assistants, braking assistants with pedestrian detection, and adaptive cruise controls, in particular, for traffic jam situations.

To enhance the safety of the occupants of a transportation vehicle, inter alia, safety assistance systems are also integrated into the transportation vehicles. For example, a wireless seat occupancy detection can be implemented, which transmits, in the case of removable seats in the passenger compartment, whether the respective seat is occupied and whether the associated safety belt was applied properly. Such a seat occupancy detection can be implemented cost-effectively via a wireless technology. Particularly energy-efficient close-range methods may be used for this purpose, for example, BLUETOOTH® Low Energy (BLE), NFC, WLAN-p, or other transmission technologies such as inductive methods, etc. A transceiver unit is located for this purpose in each seat, which evaluates the status of the belt and a seat occupancy detection mat integrated into the seat and transmits this information to the transportation vehicle. These items of information are transmitted to a monitoring unit, which regularly queries the seats present in the transportation vehicle to determine the seat configuration and occupancy and passes on the result to the transportation vehicle system. These items of information can thus be output as warnings in the transportation vehicle.

In addition to removable seats, components which are removable and/or can be locked at multiple points in the transportation vehicle are often also installed in transportation vehicles. For example, a child seat or a folding table can be provided in the transportation vehicle, which can be locked at different points in the transportation vehicle as needed at defined fastening points. These components moreover often have multiple setting positions (also referred to hereafter as positions, settable positions, or settings), using which these components can be configured differently. A child seat can, for example, also have a more comfortable recumbent position in addition to a seated position. In the case of a folding table, in addition to a folded-in storage setting, one or more usage settings (for example, half-side folding down of only one table half at a time) can also be provided.

For safety reasons, there can be components which are not permitted to occupy specific positions during travel (so-called impermissible or not recommended component arrangements). For example, it can be necessary that specific folding tables have to be completely stowed during travel to avoid injuries to the occupants. A center console can also be provided in some transportation vehicles, which is embodied to be removable, longitudinally displaceable in rails, and also vertically adjustable, for example. The various setting options by the vertical adjustment represent different positions of the center console, while locking of the center console on the transportation vehicle at multiple fastening points along a rail (or a rail system) or elsewhere in the transportation vehicle can be provided. A fastening point can be provided in the middle between driver seat and front passenger seat. A further fastening point could be located, for example, in the region of the rear seat group. In the case of the mentioned center consoles, for example, if it is fastened between driver seat and front passenger seat, raising the center console into an upper setting position can be considered to be impermissible or not recommended for reasons of usage safety. A solution is recommended which enables such an arrangement while stationary without a warning, while in driving operation the user is requested to properly stow the console by way of suitable visual and/or acoustic warning messages.

A warning message applied to the adjustable component having the description of the proper use is not sufficient, since little attention is typically paid to such warning messages and moreover not all fastening points require the same warning message. Moreover, the warning message would be applied in multiple languages, which makes rapid comprehension by the user more difficult and moreover would interfere with the visual design of the vehicle interior.

Furthermore, a mechanical solution independent of the driving status of the transportation vehicle would be possible for the general prevention of impermissible component arrangements, for example, raising an above-described center console at a critical fastening point. However, in addition to increased mechanical complexity and the costs linked thereto, such mechanical solutions also have the further drawback that even when the transportation vehicle is stationary, usage of the component is thus prevented. Furthermore, such a mechanical solution would have the drawback that possibly not all operators would intuitively understand why, for example, the center console cannot be pushed into the first seat row (due to the mechanical block in the case of a raised center console). Damage to the components thus cannot be precluded. An alternative electronically switchable blocking device would enable blocking of specific positions dependent on the driving status, however, this would require extensive additional wiring in the transportation vehicle and would further increase the mechanical complexity due to the ability to switch on this block based on the driving status. Moreover, the removability or the mobility of the components could also be restricted by a wired solution.

The described problem relates to all transportation vehicles in which the usage of specific components during travel is not to be recommended, and in which a wired solution cannot be considered due to the removability or the mobility in the transportation vehicle. This applies in principle above all to transportation vehicles and transportation vehicle types having variable interiors and also in the future to autonomously driving land vehicles and air vehicles, in which the transportation vehicle (due to the driver who is no longer present), has to perform monitoring of the transportation vehicle and keeping of the logbook independently.

The disclosed embodiments overcome or at least reduce the problems of the prior art and providing a solution for the problem of preventing impermissible or inadvisable component arrangements in a transportation vehicle. This is achieved by a method for displaying the arrangement of components in a transportation vehicle and also a transportation vehicle in which a disclosed method is used.

A first disclosed embodiment relates to a method for displaying the arrangement of components in a transportation vehicle, wherein the components are objects fixedly lockable at one or more fastening points in the transportation vehicle and the objects have at least two different setting positions. The method comprises the following operations: determining the fastening point of the locked component; determining a setting position of the locked component; acoustically and/or visually displaying the fastening point and/or the setting position of the component.

Therefore, individual fixtures (objects) in the interior of the transportation vehicle are considered to be corresponding components of the transportation vehicle. These can be, as already stated at the outset, for example, differently arrangeable folding tables, center consoles, general console elements, child seats, and further elements. These components are to be fixedly lockable at least at one point in the transportation vehicle at a fastening point, but otherwise are also to be completely removable from the transportation vehicle. Furthermore, further fastening points can be provided at other points in the transportation vehicle, so that the removed component can be locked at another point in the transportation vehicle. A fastening point can be, for example, a rigid mount, a locking position along a rail, or another device for fastening the component. Furthermore, the components are to have at least two different setting positions (configurations), between which it is possible to choose. Depending on the component, these may be different orientations (for example, seated/recumbent position in the case of a child seat) or states (for example, folded in or folded out in the case of a folding table).

The association of a specific component with a fastening point and a setting position of this component is referred to as an arrangement. The disclosed method for displaying the arrangement of components in a transportation vehicle therefore relates to providing items of information about the presence and the respective configuration of individual components. These items of arrangement information can be directed to the driver of the transportation vehicle, so that the driver can infer from the display, for example, the present configuration state of their transportation vehicle with respect to the mentioned components. The term "determination" is to be understood here as an electronic ascertainment of the component arrangement with respect to a display option, which is also to be effectuated electronically, i.e., for a display, an item of information about the arrangement of the respective component has to be ascertained beforehand.

The operation of the determination of the fastening point of the locked component is used to ascertain that a corresponding component is present in the transportation vehicle and at which point in the transportation vehicle it was locked. This ascertainment relates to the acquisition and processing of a corresponding item of arrangement information. For this purpose, an association of a component with a specific fastening point in the transportation vehicle may take place via a mechanical (for example, switching of electrical contacts based on the fastening point) or electronic (for example, by RFID marking or another suitable wireless transmission technology) coding. If, for example, a corresponding component is locked in such a fastening point, an item of information about the type of the component and the fastening point used for the locking should thus be provided. The result of the determination of the fastening point is supposed to be provided in electronic form, however, the determination as such can also include mechanical procedures, for example, the actuation of a contact switch.

The operation of determining a setting position of the locked component is to be understood similarly. Finally, the result of the determination of which setting position the locked component is presently located in is also to be present electronically. The determination can also include mechanical procedures here, for example, the actuation of a position-dependent switch.

After the determination of the fastening point and a setting position of the locked component, these items of information are provided electronically in the transportation vehicle. These items of information can then be displayed, for example, acoustically by loudspeaker output and/or visually as a light signal or in a display or can include another form of notifying the occupants (for example, messages on the smart phone of the user). However, the display does not have to explicitly reproduce the complete information here. It is sufficient also if only indirect indications are to be inferred from the display that an impermissible component arrangement exists in the transportation vehicle. The display can be restricted to a notification of a specific impermissible setting position of a component. An acoustic display of the arrangement can be performed, for example, by a specific sound signal such as a gong or ringing, however, a concrete speech statement could also be performed, for example, that a folding table in the rear region of the transportation vehicle has just assumed a different position. A visual display is to be understood as a symbolic or spoken representation of the corresponding items of information in a display, for example, a head-up display (HUD) or an instrument cluster of the transportation vehicle. The driver can thus be unambiguously informed about an impermissible component arrangement. Confusion or bewilderment of the driver is not to be expected here.

The disclosed embodiments are thus able to provide items of information about the arrangement of corresponding components in the transportation vehicle to the occupants of the transportation vehicle, without the occupants having these in the field of view or having to pay special attention to them. Impermissible component arrangements in a transportation vehicle are thus to be prevented during driving operation. For this purpose, the occupants and, in particular, the driver of the transportation vehicle are to be notified separately of the presence of such an impermissible component arrangement. The driver or user of a transportation vehicle is therefore permitted to use such an arrangement while stationary without a warning, while they can be informed in driving operation about the impermissibility of this arrangement by suitable visual and/or acoustic warning messages. A multilanguage instruction, for example, via a warning sign attached to the respective component, can be omitted, since in addition to an output notification, clear handling instructions can also be transmitted to the user of the transportation vehicle.

In at least one disclosed embodiment, it is provided that to determine the fastening point of the component and a setting position of the component, items of arrangement information are transmitted between the component and the transportation vehicle wirelessly via a radio connection. This has the benefit that a wired connection does not have to be led to the respective fastening point. The fastening points can be embodied as passive components, which only enable mechanical locking of the component. However, the fastening point may be individually recognizable by the component via a coding upon locking. This coding can be produced mechanically (for example, by an individual shaping of the fastening point), optically (for example, by an applied barcode), or electronically (for example, by RFID marking or another suitable wireless transmission technology). The radio connection may be established between the component and the transportation vehicle. Alternatively, however, a corresponding transmitter unit can also be provided at the fastening point.

The radio connection may be established between a transmitter module of the component and a receiver module of the transportation vehicle, wherein the vehicle-side receiver module is configured for use with a variety of components. This has the benefit that the vehicle-side receiver module can be used as a central remote station for multiple components and only has to be provided once in the transportation vehicle. It can also be a receiver module already configured in the transportation vehicle for other information transmission functions here, for example, a transceiver module also used for wireless seat occupancy detection. In the case of a transmitter module arranged in the component, it can be an energy-saving battery-operated transmitter. Such a component does not require an additional power supply at the fastening point and can therefore omit electronic contacts and external wiring. The radio connection may be established by BLUETOOTH® Low Energy (BLE) or 5G, which represent the presently most energy-saving transmission platforms. Radio connections by NFC, WLAN-p, or via other transmission technologies such as inductive methods are also recommended. A maintenance-free function of the components over a long period of time is thus ensured and a power supply can be ensured over multiple years.

In an exemplary embodiment, the component can also comprise a receiver module or a combined transceiver module. Further functions can thus be carried out such as an active query of the component, for example, with respect to its arrangement or the status of a battery integrated in the component. A corresponding receiver module or a combined transceiver module then has to be provided in the transportation vehicle. Only passive transmission of the components has the drawback that this transmission takes place independently of the usage state of the transportation vehicle.

A further option for saving energy is that the locked component transmits items of information about the fastening point and/or about a setting position of the component to the transportation vehicle regularly (i.e., not continuously). A transmission could take place, for example, at a time interval of a few seconds.

In at least one disclosed embodiment, it is provided that the acoustic and/or visual display of the fastening point and/or the setting position of the component only takes place in case of an impermissible arrangement of the component. Such a display is then output specially emphasized as a warning message.

A restriction of the display to impermissible component arrangements can take place, on the one hand, in that the determination of the fastening point and the setting position of the locked component are already restricted to impermissible arrangements of the component. Since thus only impermissible component arrangements are determined, a display is restricted to such impermissible arrangements of the components.

Alternatively, a corresponding evaluation of component arrangements can also only take place electronically in the transportation vehicle. This means that items of information about impermissible or all permissible component arrangements are stored electronically in the transportation vehicle and they are taken into consideration in the display. A corresponding method or mechanism for evaluation then compares these stored items of information to the items of information resulting from the individual determinations according to the method and evaluates them. If the check has the result that an impermissible arrangement of a component exists, a corresponding display takes place in the transportation vehicle.

The determination of the fastening point of the component and a setting position of the component may be carried out by mechanical contact switches connected in series. These can be, for example, microswitches, Reed contacts, or the like for this purpose. For example, the first contact switch can be switched by locking at a specific fastening point. The second electronic switch can be switched in the case of a specific setting position. In particular, with an impermissible component arrangement, i.e., with a specific undesired combination of fastening point and setting position, both contact switches can then be closed and thus enable a corresponding determination of the arrangement. For example, a transmitter unit provided in the component can be activated to establish a radio connection by the mechanical contact switches connected in series.

A further disclosed embodiment relates to a transportation vehicle comprising a component, wherein the component is an object fixedly lockable at one or more fastening points in the transportation vehicle, the object has at least two different setting positions, and the transportation vehicle and the component are configured to perform a disclosed method.

For this purpose, the transportation vehicle can comprise a method or mechanism for ascertaining the fastening point and the setting position of the component and a method or mechanism for acoustic and/or visual display of the fastening point and/or the setting position of the component. The means for ascertaining the fastening point and the setting position of the component can be an electronic circuit, which provides the items of electronic information to the method or mechanism for the display. Further component parts for determining the fastening point of the component and a setting position of the component can be connected upstream and/or downstream of the method or mechanism for ascertaining the fastening point and the setting position of the component. These further component parts can include, for example, contact switches, radio units, and a possibly provided method or mechanism for evaluating the items of information transmitted by the component.

Optionally, the transportation vehicle comprises a receiver module and the component comprises a transmitter module, which are configured to transmit items of arrangement information wirelessly via a radio connection between the component and the transportation vehicle. Furthermore, the transportation vehicle can also comprise a corresponding transmitter module (or a combined transceiver module) and the component can comprise a receiver module (or a combined transceiver module). Bidirectional radio connections can thus also be established between the transportation vehicle and the individual components. This enables a deliberate query of individual components, for example, with respect to the arrangement or the battery status thereof.

Further disclosed embodiments result from the remaining features mentioned in the dependent claims.

The various exemplary embodiments mentioned in this application are combinable with one another, if not indicated otherwise in the specific case.

FIG. 1 shows a schematic illustration of a method 10 for displaying the arrangement of components in a transportation vehicle. For transportation vehicles which comprise removable components fixedly lockable at one or more fastening points in the transportation vehicle having at least two different setting positions, the method 10 comprises the following operations: determining the fastening point 12 of the locked component; determining a setting position 14 of the locked component; acoustically and/or visually displaying 16 the fastening point and/or the setting position of the component. The acoustic and/or visual display 16 of the fastening point and/or the setting position of the component optionally only takes place in case of an impermissible component arrangement. This can be implemented in that the determination 12, 14 of the fastening point and the setting position of the locked component is restricted to impermissible arrangements of a component. Alternatively, a corresponding evaluation of component arrangements can also first take place electronically in the transportation vehicle.

Figure 2:
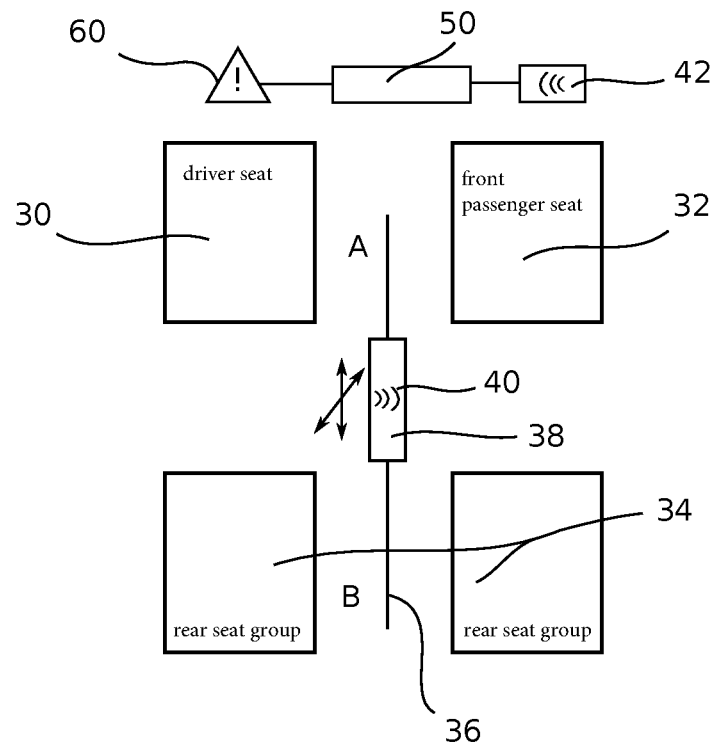
FIG. 2 shows an illustration of an exemplary embodiment of a disclosed transportation vehicle.

FIG. 2 shows an illustration of an exemplary embodiment of a disclosed transportation vehicle. The implementation of a disclosed method is shown on the basis of the example of a removable center console or a center table as a corresponding component 38. These are provided for locking at a fastening point A in the front transportation vehicle region between driver seat 30 and front passenger seat 32. Further independent fastening points can be provided elsewhere in the transportation vehicle. A locking can also take place on the transportation vehicle as shown at multiple fastening points A, B along a rail (or a rail system) 36, whereby a displacement of the center console is also enabled in the region of the rear seat group 34. It is assumed as a simplification with respect to the possible setting positions of the center console that it essentially permits two different height settings, i.e., a lower and an upper height position. For reasons of usage safety, locking at the front fastening point A with an upper height setting is considered to be an impermissible component arrangement. Such impermissible component arrangements in a transportation vehicle are supposed to be effectively prevented by the disclosed embodiments.

For this purpose, the center console can be equipped with a contact switch (microswitch, Reed contact, or the like), which detects whether the center console is located between the driver seat 30 and the front passenger seat 32. A second electronic switch can be used to query whether the console 38 is located in a position other than the permissible driving position (i.e., in the lower height setting). The two switches can be connected in series. If the center console is locked on the rail 36 between the driver seat 30 and the front passenger seat 32 and is not located in the lower height setting, a corresponding signal can then be transmitted to a receiver unit integrated in the transportation vehicle (i.e., transmitter or transceiver unit 42 of the transportation vehicle) via an electronic unit in the center console (i.e., transmitter or transceiver unit 40 of the component 38), wherein a method or mechanism for ascertaining the fastening point and the setting position of the locked component 50 evaluates this signal and thus performs a determination of the fastening point (center console locked on the rail 36 at the fastening point A between the driver seat 30 and the front passenger seat 32) and a setting position (lower height setting) of the locked component 38. A corresponding acoustic and/or visual warning message (roughly: center console in impermissible arrangements) can be generated therefrom and signaled to the driver, for example, via a corresponding method or mechanism for acoustic and/or visual display 60.

Such a solution has a variety of benefits over the above-mentioned problems in the prior art. The center console can thus still be moved freely in the rail (or the rail system), also in the first seat row. A mechanical block, which prevents locking of the vertical adjustment in the first seat row, is not necessary in this case. A center console designed as a center table can also be used in the first seat row (for example, as a half-side worktable if the front passenger seat is not occupied) when stationary (ignition off). This solution is implementable cost-effectively by a transceiver unit, which is possibly already provided, of the seat occupancy detection.

LIST OF REFERENCE SIGNS

10 method for displaying the arrangement of components
12 determining the fastening point of a locked component
14 determining a setting position of a locked component
16 acoustic and/or visual display
30 driver seat
32 front passenger seat
34 rear seat group
36 rail (or rail system) having different fastening points
38 component (center console/center table having different height positions)
40 transmitter or transceiver unit of the component
42 transmitter or transceiver unit of the transportation vehicle
50 method or mechanism for ascertaining the fastening point and a setting position of a locked component
60 method or mechanism for acoustic and/or visual display
A, B fastening points

The invention claimed is:

1. A method for displaying an arrangement of components in a transportation vehicle, wherein the components are objects fixedly lockable at one or more fastening points in the transportation vehicle and the objects have at least two different setting positions, the method comprising:
    determining the fastening point of the locked component;
    determining a setting position of the locked component; and
    acoustically and/or visually displaying the fastening point and/or the setting position of the component.

2. The method of claim 1, wherein, items of arrangement information are transmitted wirelessly between the component and the transportation vehicle via a radio connection to determine the fastening point of the component and a setting position of the component.

3. The method of claim 2, wherein the radio connection is established between a transmitter module of the component and a receiver module of the transportation vehicle, wherein the receiver module of the transportation vehicle is used with a variety of components.

4. The method of claim 2, wherein the radio connection is established by BLUETOOTH® Low Energy, 5G, NFC, or WLAN-p.

5. The method of claim 1, wherein the locked component regularly transmits items of information about the fastening point of the component and/or its setting position to the transportation vehicle.

6. The method of claim 1, wherein the acoustic and/or visual display of the fastening point and/or the setting position of the component only takes place in response to an impermissible arrangement of the component.

7. The method of claim 1, wherein the determination of the fastening point of the component and a setting position of the component is performed by mechanical contact switches connected in series.

8. The method of claim 1, wherein the method is performed by a transportation vehicle comprising a component, wherein the component is an object fixedly lockable at one or more fastening points in the transportation vehicle, the object comprising at least two different setting positions.

9. The method of claim 8, wherein the transportation vehicle further comprises a means for ascertaining the fastening point and the setting position of the component and a means for acoustically and/or visually displaying the fastening point and/or the setting position of the component.

10. The method of claim 8, wherein the transportation vehicle further comprises a receiver module and the component further comprises a transmitter module, which transmits items of arrangement information wirelessly between the component and the transportation vehicle via a radio connection.

* * * * *